(No Model.)

E. S. FRAZIER.
BALL BEARING FOR VEHICLE WHEELS.

No. 482,896. Patented Sept. 20, 1892.

Witnesses:
John L. Jackson
Ralph Vandyke

Inventor:
Edward S. Frazier
By Bond Adams & Pickard
Attorneys

UNITED STATES PATENT OFFICE.

EDWARD S. FRAZIER, OF AURORA, ILLINOIS.

BALL-BEARING FOR VEHICLE-WHEELS.

SPECIFICATION forming part of Letters Patent No. 482,896, dated September 20, 1892.

Application filed March 19, 1892. Serial No. 425,634. (No model.)

*To all whom it may concern:*

Be it known that I, EDWARD S. FRAZIER, a citizen of the United States, residing at Aurora, in the county of Kane and State of Illinois, have invented certain new and useful Improvements in Bearings, of which the following is a specification, reference being had to the accompanying drawings, in which—

Figure 1:
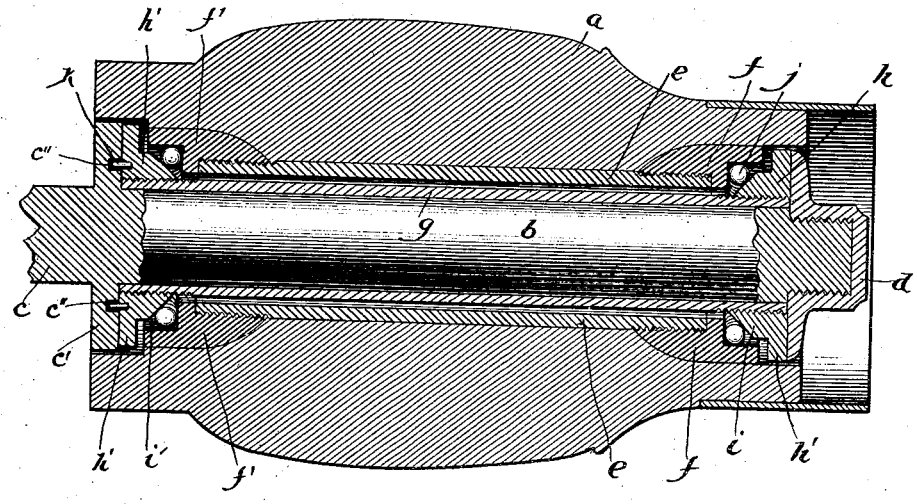
Figure 2:
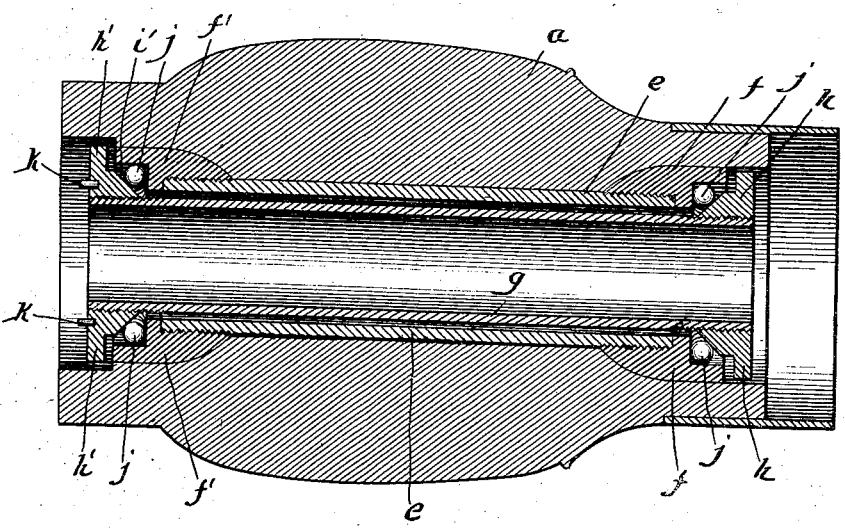

Figure 1 is a central vertical section of a wheel-hub, the spindle being inserted in the hub; and Fig. 2 is a similar view, the spindle being removed.

My invention relates to bearings for wheeled vehicles, and more particularly to that class known as "ball-bearings."

In ball-bearings as heretofore made it has been necessary to remove the balls or to interfere with the adjustment of the bearings whenever the hub was removed from the spindle, necessitating a frequent adjustment of the balls.

The object of my invention is to provide an improved ball-bearing, which shall be specially adapted for use on sulkies, buggies, and other similar wheeled vehicles in which the hub may be removed from the spindle without exposing the balls of the bearing and in which the necessity of readjusting the balls at each removal of the spindle will be avoided. I accomplish this object as hereinafter specified and as illustrated in the drawings.

That which I regard as new will be pointed out in the claims.

In the drawings, $a$ indicates a hub of a wheel, and $b$ an ordinary spindle.

$c$ indicates the axle-tree, which carries the spindle.

$c'$ indicates an axle-collar, which is provided at suitable points on its inner surface with one or more recesses $c''$, as best shown in Fig. 1.

$d$ indicates an ordinary nut for securing the spindle in place in the hub.

$e$ indicates a sleeve, which is fitted into the hub $a$, as best shown in Fig. 1, and is provided with screw-threaded ends to adapt them to receive hardened steel bushes $f f'$, as shown in the drawings. The bushes $f f'$ are preferably provided with angular bearing-surfaces, as shown, and the length of the sleeve $e$ is such that the bushes $f f'$ will be incased in the hub.

$g$ indicates a sleeve, which is of sufficient size to receive the spindle $b$ and to fit into the sleeve $e$. The sleeve $g$ is about of the same length as the spindle $b$, and is screw-threaded at its ends to receive collars $h h'$, as shown. The collars $h h'$ are of hardened steel, and are provided with beveled or conical bearing-surfaces $i i'$, as shown.

$j$ indicates a number of hardened steel balls, which are placed in the space between the bearings $i i'$ and the respective bushes $f f'$.

$k$ indicates one or more lugs or pins, which project from the outer surface of the collars $h'$, and are adapted to fit into the recesses $c''$ in the axle-collar $c'$, as shown in Fig. 1. By screwing the collars $h h'$ upon the sleeve $g$ they may be set up to take up wear, or they may be removed, when desired, to gain access to the balls $j$.

It is evident that it is immaterial whether the lugs $k$ are formed on the collar $h$ and the recesses $c''$ in the axle-collar, or vice versa, as the operation will be the same in either case.

When the wheel revolves, the collar $g$ will be held stationary by the engagement of the lugs $k$ in the recesses $c''$, and the hub will turn upon the balls $j$. When it is desired to remove the wheel from the spindle, by unscrewing the nut $d$ the spindle may be withdrawn from the sleeve $g$, which will be held in place in the hub by means of the collars $h h'$. By this construction the sleeve $g$ will always retain its place in the hub unless one or both collars $h h'$ are removed and the adjustment of the balls will always remain the same unless the collars $h h'$ are moved upon the sleeve $g$.

Instead of balls $j$ suitable rollers may be used.

That which I claim as my invention, and desire to secure by Letters Patent, is—

1. The combination, with a hub, of bushes $f f'$, a sleeve $g$, having collars $h h'$, and balls interposed between the collars $h h'$ and the bushes $f f'$, substantially as described.

2. The combination, with a wheel-hub, of a non-rotary cylindrical sleeve on which the hub revolves, ball-bearings located at opposite ends of the sleeve, and collars secured to the ends of the sleeve and adjustable thereupon for the purpose of retaining the sleeve in position and preventing its displacement when the hub is removed from the axle-spindle, substantially as described.

3. The combination, with a hub having a sleeve $e$ and bushes $f f'$, of a sleeve $g$, having collars $h\ h'$ adjustably secured thereon, and balls interposed between said collars and the bushes $f f'$, substantially as described.

EDWARD S. FRAZIER.

Witnesses:
JOHN L. JACKSON,
RALPH VAN DYKE.